(12) United States Patent
Cherry et al.

(10) Patent No.: US 11,418,622 B2
(45) Date of Patent: Aug. 16, 2022

(54) SYSTEM AND METHODS FOR WEB-BASED SOFTWARE APPLICATION TRANSLATION

(71) Applicant: BATON SIMULATIONS, Montreal (CA)

(72) Inventors: Sebastien Cherry, Saint-Lambert (CA); Stephane Gosselin, Montreal (CA)

(73) Assignee: BATON SIMULATIONS, Montreal (CA)

( * ) Notice: Subject to any disclaimer, the term of this patent is extended or adjusted under 35 U.S.C. 154(b) by 0 days.

(21) Appl. No.: 16/996,782

(22) Filed: Aug. 18, 2020

(65) Prior Publication Data

US 2022/0060565 A1 Feb. 24, 2022

(51) Int. Cl.
*H04L 67/00* (2022.01)
*G06F 40/12* (2020.01)
*G06F 17/00* (2019.01)

(52) U.S. Cl.
CPC .............. *H04L 67/34* (2013.01); *G06F 40/12* (2020.01); *G06F 17/00* (2013.01)

(58) Field of Classification Search
CPC ......... H04L 67/34; G06F 40/12; G06F 17/00; G06F 17/28; G06F 17/30; G06F 17/2223; G06F 17/2863; G06F 17/289; G10L 11/00
See application file for complete search history.

(56) References Cited

U.S. PATENT DOCUMENTS

| | | |
|---|---|---|
| 8,050,906 B1 | 11/2011 | Zimmerman et al. |
| 8,126,702 B2 | 2/2012 | Lang et al. |
| 9,128,918 B2 | 9/2015 | Travieso et al. |
| 9,135,349 B2 | 9/2015 | Kent et al. |
| 10,198,438 B2 | 2/2019 | Cheng et al. |
| 10,235,363 B2 | 3/2019 | Snitko et al. |
| 10,275,462 B2 | 4/2019 | Scharnbacher |
| 10,430,521 B2 | 10/2019 | Bestfleisch et al. |

(Continued)

OTHER PUBLICATIONS

Juhas, "RTL Tester Mirror", https://wordpress.org/plugins/rtl-tester-mirror/, accessed Jun. 18, 2020, pdf 4 pages.

(Continued)

*Primary Examiner* — Quoc A Tran
(74) *Attorney, Agent, or Firm* — BCF LLP

(57) ABSTRACT

A computer-implemented method for translating a user-interface of a web-based software application in a web browser environment. The method comprises receiving a request to translate the user-interface from a source language to a target language. A user-interface source code is browsed, the browsing comprising: locating source text elements of the user-interface source code to be translated from the source language to the target language, populating a correspondence table with the source text elements, associating the source text elements of the correspondence table with target text elements, the target text elements corresponding to source text elements translated in the target language, generating a translated user-interface source code based on the user-interface source code and the correspondence table, and rendering the translated user-interface source code in the web browser. A system for translating a user-interface of a web-based software application in a web browser environment configured to perform the method is disclosed.

16 Claims, 12 Drawing Sheets

(56) References Cited

U.S. PATENT DOCUMENTS

| | | | |
|---|---|---|---|
| 2008/0082317 A1* | 4/2008 | Rosart | G06F 40/58 704/8 |
| 2012/0072831 A1* | 3/2012 | Li | G06F 9/454 715/236 |
| 2013/0282360 A1* | 10/2013 | Shimota | G06F 40/58 704/7 |
| 2014/0019951 A1 | 1/2014 | Petrova | |
| 2015/0120274 A1 | 4/2015 | Forbush | |
| 2019/0056961 A1 | 2/2019 | Dimov | |
| 2019/0243878 A1* | 8/2019 | Kemmel | G06F 40/106 |
| 2020/0293266 A1* | 9/2020 | German | G06F 3/162 |

OTHER PUBLICATIONS

Bidirectionality, Material Design, https://material.io/design/usability/bidirectionality.html, accessed Jun. 18, 2020, pdf 25 pages.

* cited by examiner

Figure 4

SYSTEM AND METHODS FOR WEB-BASED SOFTWARE APPLICATION TRANSLATION

FIELD

The present technology relates to systems and methods of web-based translation services. In particular, the systems and methods real-time translation management solution for web-based software applications.

BACKGROUND

The operations of an enterprise may depend on a variety of enterprise software applications (ESA) including, for example, an enterprise resource planning (ERP) software application, a customer relationship management (CRM) software application, a master data governance (MDG) software application, and/or the like, that may rely on web-based services. Indeed, some of these software applications may be available as software as a service (SaaS), hosted on a cloud platform, such that users may remotely access the software applications via a user-interface. Therefore, ESA providers may desire to provide and deploy translated versions of their ESAs to meet worldwide demand of enterprises and especially large-scale companies without having to create multiple software applications for each language. Even though translation software applications and web-based translation tools are available in the marketplace, most of them are not suitable for sinistrodextral, or "Left-to-Right" (LTR) language script to dextrosinistral, or "Right-to-Left" (RTL) language script (i.e for Arabic or Hebrew translation) translation or vice versa, and/or are not independent from the enterprise software application source code. Therefore, improvements are still desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art.

In particular, such shortcomings may comprise (1) Right-to-Left (RTL) to Left-to-Right (LTR) or LTR-to-RTL translation; (2) dependency of the translation system from the software application source code; and/or (3) reliability of translation references.

In one aspect, various implementations of the present technology provide a computer-implemented method for translating a user-interface of a web-based software application in a web browser environment, the method comprising:
  receiving, at a web browser, a request to translate the user-interface from a source language to a target language;
  browsing a user-interface source code, the browsing comprising:
    locating source text elements of the user-interface source code to be translated from the source language to the target language;
    populating a correspondence table with the source text elements;
    associating the source text elements of the correspondence table with target text elements, the target text elements corresponding to source text elements translated in the target language;
  generating a translated user-interface source code based on the user-interface source code and the correspondence table; and
  rendering the translated user-interface source code in the web browser.

In some implementations of the present technology, associating the source text elements of the correspondence table with the target text elements comprises:
  transmitting the source text elements to a translation service; and
  receiving the target text elements translated in the target language.

In some implementations of the present technology, the translation service is a web-based translation provider.

In some implementations of the present technology, prior to generating the translated user-interface source code, the target text elements are presented to a user for review and edition.

In some implementations of the present technology, generating the translated user-interface source code further comprises:
  selecting a first element of the user-interface source code;
  applying a replacement process to the first element, the replacement process comprising:
    if determination is made that child elements of the first element are marked as replaced, replacing a source text element of the first element by a corresponding target text element and marking the first element as replaced;
    if determination is made that one or more child elements of the first element are not marked as replaced:
      selecting one of the one or more child elements of the first element;
      applying the replacement process to the one of the one or more child elements of the first element;
    if determination is made that the first element is marked as replaced, applying the replacement process to a parent element of the first element.

In some implementations of the present technology, one of the source language or the target language is a dextrosinistral (Right-To-Left) language script and another one of the source language or the target language is a sinistrodextral (Left-To-Right) language script.

In some implementations of the present technology, generating the translated user-interface source code further comprises:
  selecting a second element in the user-interface source code;
  applying a layout mirroring process to the second element, the layout mirroring process comprising:
    if determination is made that child elements of the second element are marked as mirrored, editing layout elements corresponding to the second element to horizontally mirror the layout of the second element and marking the second element as mirrored;
    if determination is made that one or more child elements of the second element are not marked as mirrored:
      selecting one of the one or more child elements of the second element;
      applying the layout mirroring process to the one of the one or more child elements of the second element; and if determination is made that the second element is marked as mirrored, applying the layout mirroring process to a parent element of the second element.

In some implementations of the present technology, prior to applying the layout mirroring process:

determining if the second element is a special element, the special elements being selected from a group consisting of: calendars, carousels, graphs and charts; and if the second element is a special element, marking the second element as mirrored.

In some implementations of the present technology, applying the replacement process to the first element and applying the layout mirroring process to the second element are executed simultaneously.

In some implementations of the present technology, the correspondence table is hosted in a memory of the web-browser.

In some implementations of the present technology, the user-interface is a part of a set of user-interfaces comprising a plurality of user interfaces and browsing a user-interface source code comprises browsing a plurality of user-interface sources codes, the plurality of user-interface source codes corresponding to the plurality of user interfaces comprised in the set of user-interfaces.

In one aspect, various implementations of the present technology provide a system for translating a user-interface of a web-based software application in a web browser environment, the system comprising:

a user device communicably connected to a web server via a network and hosting the web-based software application, the user device comprising:
   a display device configured to render the user-interface;
   a memory configured to store a plurality of text elements and instructions; and
   a processor operably coupled to the memory and configured to execute the instructions that, when executed, results in operations comprising:
      receiving, at a web browser, a request to translate the user-interface from a source language to a target language;
      browsing a user-interface source code, the browsing comprising:
         locating source text elements of the user-interface source code to be translated from the source language to the target language;
         populating a correspondence table with the source text elements;
         associating the source text elements of the correspondence table with target text elements, the target text elements corresponding to source text elements translated in the target language;
         generating a translated user-interface source code based on the user-interface source code and the correspondence table; and
         rendering the translated user-interface source code in the web browser.

In some implementations of the present technology, prior to generating the translated user-interface source code, the processor is further configured to present the target text elements to a user for review and edition.

In some implementations of the present technology, prior to applying the layout mirroring process, the processor is further configured to:

determine if the second element is a special element, the special elements being selected from a group consisting of: calendars, carousels, graphs and charts; and if the second element is a special element, mark the second element as mirrored.

In some implementations of the present technology, the processor is further configured to apply the replacement process to the first element and apply the layout mirroring process to the second element are executed simultaneously.

In some implementations of the present technology, the correspondence table is hosted in the memory of the user device.

In the context of the present specification, unless expressly provided otherwise, a computer system may refer, but is not limited to, an "electronic device", an "operation system", a "system", a "computer-based system", a "controller unit", a "monitoring device", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 4 is an interface of a local dictionary of a Translation Memory in accordance with one embodiment of the present technology;

Figure 1:
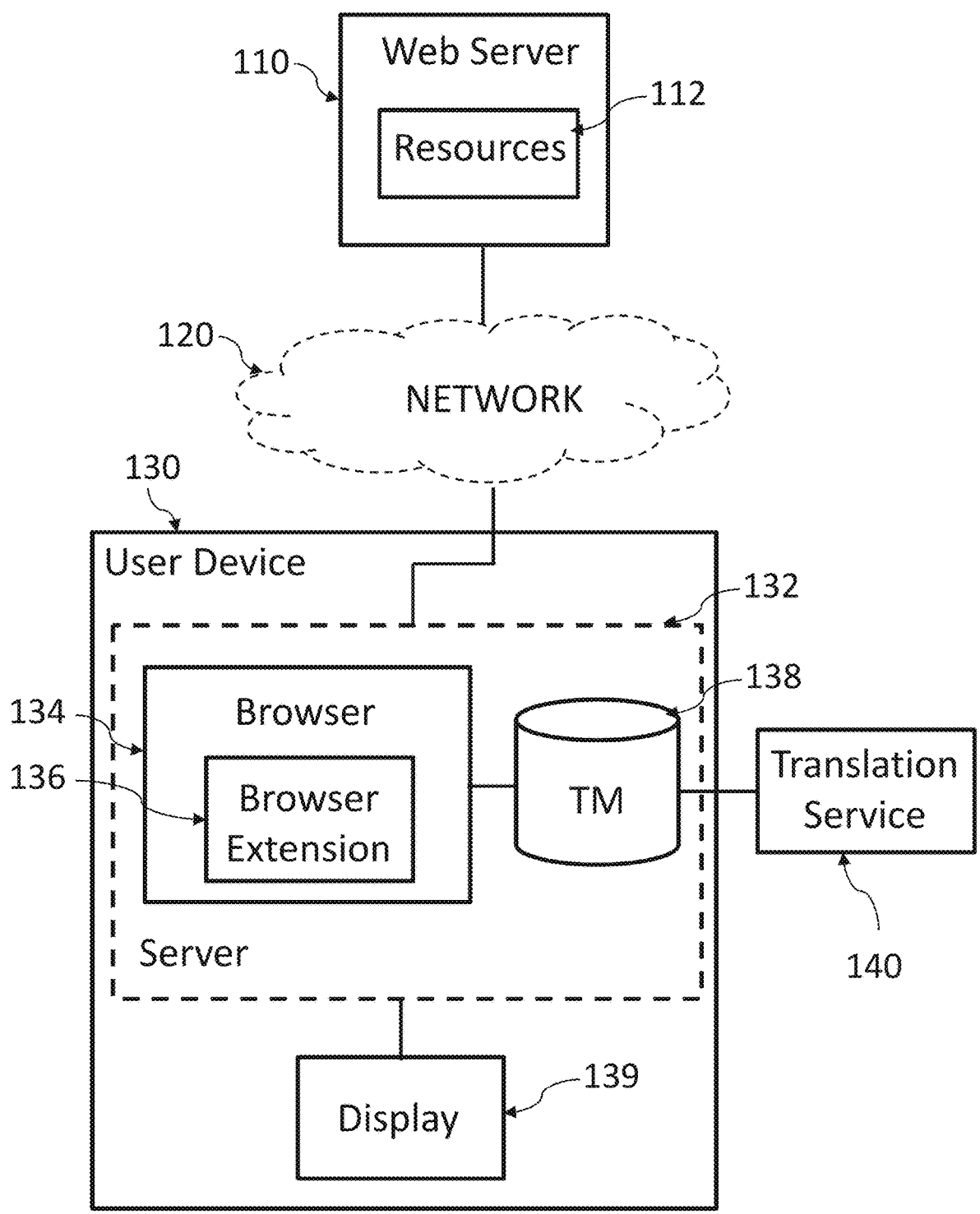
FIG. 1 is a block diagram of a user-server environment in accordance with an embodiment of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes that may be substantially represented in non-transitory computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that modules may include for example, but without being limitative, computer program logic, computer program instructions, software, stack, firmware, hardware circuitry or a combination thereof which provides the required capabilities.

Various aspects of the present disclosure generally address one or more of the problems found in conventional translation software applications and translations web-based tools. To this end, the present disclosure, amongst other aspects, introduces a real-time translation management system for web-based software applications and content.

With these fundamentals in place, we will now consider some non-limiting examples to illustrate various implementations of aspects of the present technology.

FIG. 1 is a block diagram of a web-browser environment 100 in accordance with an embodiment of the present technology. In the illustrative embodiment, the web-browser environment 100 comprises a web server 110 comprising resources 112, a network 120, a user device 130 comprising a user server 132 and a display device 139. The user server 132 comprises a web-browser 134, or "browser", and is communicably connected to the web server 110 via the network 120. The user server is configured to access resources 112 and render a user-interface source code corresponding to the resources 112 on the display device 139. The user server is communicably connected to a Translation-Memory™ 138 configured to store text elements, or "terms", in different languages under the form of a correspondence table comprising a first list of text element in a source language and a second list of text element in a target language, each text element of the list corresponding to a translation of a text element of the first list. The TM 138 is communicably connected to a translation service 140 that provides the second list of the correspondence table based on the first list of the TM 138. The translation service 140 may be a translation providing software application and may be hosted on a web server with similar or different features as the web server 110. In one embodiment, the TM 138 communicates with the translation service 140 via a network that may be network 120 or a network with similar or different features. In the same or another embodiment, the TM 138 is located within a database of the web browser 134 (e.g., IndexedDB database of Google Chrome web browser). The web browser 134 comprises a browser extension 136 that may be configured to generate a translated user-interface source code of a resource 112 requested by a user to be displayed on the display device 139.

The target language is selected by a user. As an example, "German" may be selected as a target language in the web browser extension 136 if the user wants to have the user-interface displayed in German on the display device 139.

Network 120 may be any network or combination of networks that can carry data communication. Network 120 may include, but is not limited to, a local area network, metropolitan area network, and/or wide area network such as the Internet. Network 120 can support protocols and technologies including, but not limited to, World Wide Web, protocols such as a HyperText Transfer Protocol ("HTTP") protocols, and/or services. Depending upon a particular application or environment, intermediate web servers, gateways, or other servers may be implemented between components of the system shown in FIG. 1.

Web server 110 is a computing device or an application executing on a computing device that hosts resources 112. Resources 112 are associated with a domain name and hosted by one or more web servers 110. Web server 110 delivers resources 112 to user device 130 upon request of a user. Resource 112 may comprise a web-based software application, a hypertext markup language (HTML) page, an ERP and/or SaaS web-based application and/or any data that can be provided over network 120 that may be represented under the HTML language. Resource 112 is identified by a resource address that is associated with each resource 112.

User device 130 is an electronic device used by the user to remotely access the resources of the web server 110 via the network 120. The user device 130 includes a server 132 comprising the web browser 132. The user device 130 may be personal computers, mobile communication devices, or the like.

Browser 134 comprises the browser extension 136. The browser extension 136 is an application configured perform specific operations and/or extend functionalities of the browser 134. The browser extension 136 may be downloaded from the web server 110 and installed on the user device as part of the browser 134. The browser extension 136 is configured to process a resource from the web server 110 upon reception of the resource 112 by the web browser 134 in the user device 130.

Upon activation, the browser extension 136, communicably connected to the TM 138, is configured to generate the translated user-interface source code based on a user-interface source code corresponding to the resource 112, the user-interface source code (i.e. HTML code) of the resource 112 being originally coded in the source language and the translated user-interface source code being displayed in the target language selected by the user. In one aspect, the browser extension 136 is configured to locate the text elements of the resource 112, populate the correspondence table of the TM 138 with the text elements in the source language, and generate a translated version of the user-interface source code, namely the translated user-interface source code, to be rendered by the display 139; the TM 138 being communicably connected to the translation service 140 and hosting the correspondence table configured to associate the text elements in the source language to text elements in the target language provided by the translation service 140, the text elements in the target language corresponding to text elements in the source language being a translation of the corresponding text element in the source language. The text elements may be words and/or sentences.

A process of the translation of the user-interface source code of the resource will be further described hereinafter.

Although one server is illustrated on FIG. 1, the user environment 100 may include a different number of web servers. This aspect is not limitative.

Figure 2:
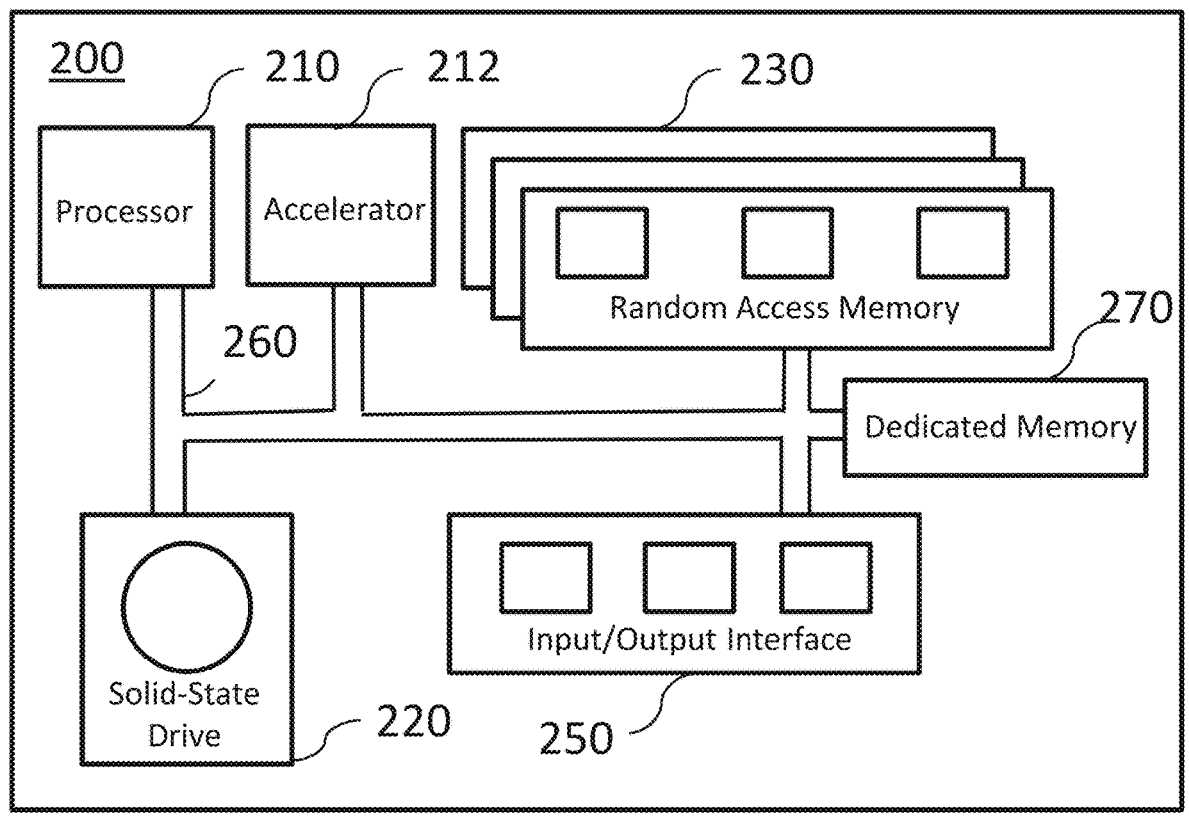
FIG. 2 is a diagram of a computing system in accordance with an embodiment of the present technology.

FIG. 2 illustrates a diagram of a computing system 200 in accordance with an embodiment of the present technology. In some embodiments, the computing system 200 may be implemented by any of a conventional personal computer, a server, a router, a switch, a controller, and/or an electronic device (e.g., a server, a controller unit, a control device, a monitoring device etc.) and/or any combination thereof appropriate to the relevant task at hand. In particular, the computing system may be implemented as the user server. In some embodiments, the computing system 200 comprises various hardware components including one or more single or multi-core processors collectively represented by a processor 110, a solid-state drive 220, a RAM 230, a dedicated memory 270 and an input/output interface 250. The computing system 200 may be a generic computer system.

The TM 138 may be hosted on the solid-state drive 220, the RAM 230 and/or on the dedicated memory 270. The correspondence table may be therefore locally accessed by the user. In the same or another embodiment, the user may review and manually edit the text elements of the correspondence table.

In some other embodiments, the computing environment 200 may be an "off the shelf" generic computer system. In some embodiments, the computing system 200 may also be distributed amongst multiple systems. The computing system 200 may also be specifically dedicated to the implementation of the present technology. As a person in the art of the present technology may appreciate, multiple variations as to how the computing system 200 is implemented may be envisioned without departing from the scope of the present technology.

Communication between the various components of the computing system 200 may be enabled by one or more internal and/or external buses 260 (e.g. a PCI bus, universal serial bus, IEEE 1394 "Firewire" bus, SCSI bus, Serial-ATA bus, ARINC bus, etc.), to which the various hardware components are electronically coupled.

The input/output interface 250 may provide networking capabilities such as wired or wireless access. As an example, the input/output interface 250 may comprise a networking interface such as, but not limited to, one or more network ports, one or more network sockets, one or more network interface controllers and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 220 stores program instructions suitable for being loaded into the RAM 230 and executed by the processor 210. For example, the program instructions may be part of the web browser extension 136. Although illustrated as a solid-state drive 220, any type of memory may be used in place of the solid-state drive 220, such as a hard disk, optical disk, and/or removable storage media.

In some embodiments of the present technology, the processor 210 may be a general-purpose processor, such as a central processing unit (CPU) or a processor dedicated to a specific purpose, such as a digital signal processor (DSP). In some embodiments, the processor 110 may also rely on an accelerator 212 dedicated to certain given tasks, such as executing the methods set forth in the paragraphs below. In some embodiments, the processor 210 or the accelerator 212 may be implemented as one or more field programmable gate arrays (FPGAs). Moreover, explicit use of the term "processor", should not be construed to refer exclusively to hardware capable of executing software, and may implicitly include, without limitation, application specific integrated circuit (ASIC), read-only memory (ROM) for storing software, RAM, and non-volatile storage. Other hardware, conventional and/or custom, may also be included.

Figure 3:
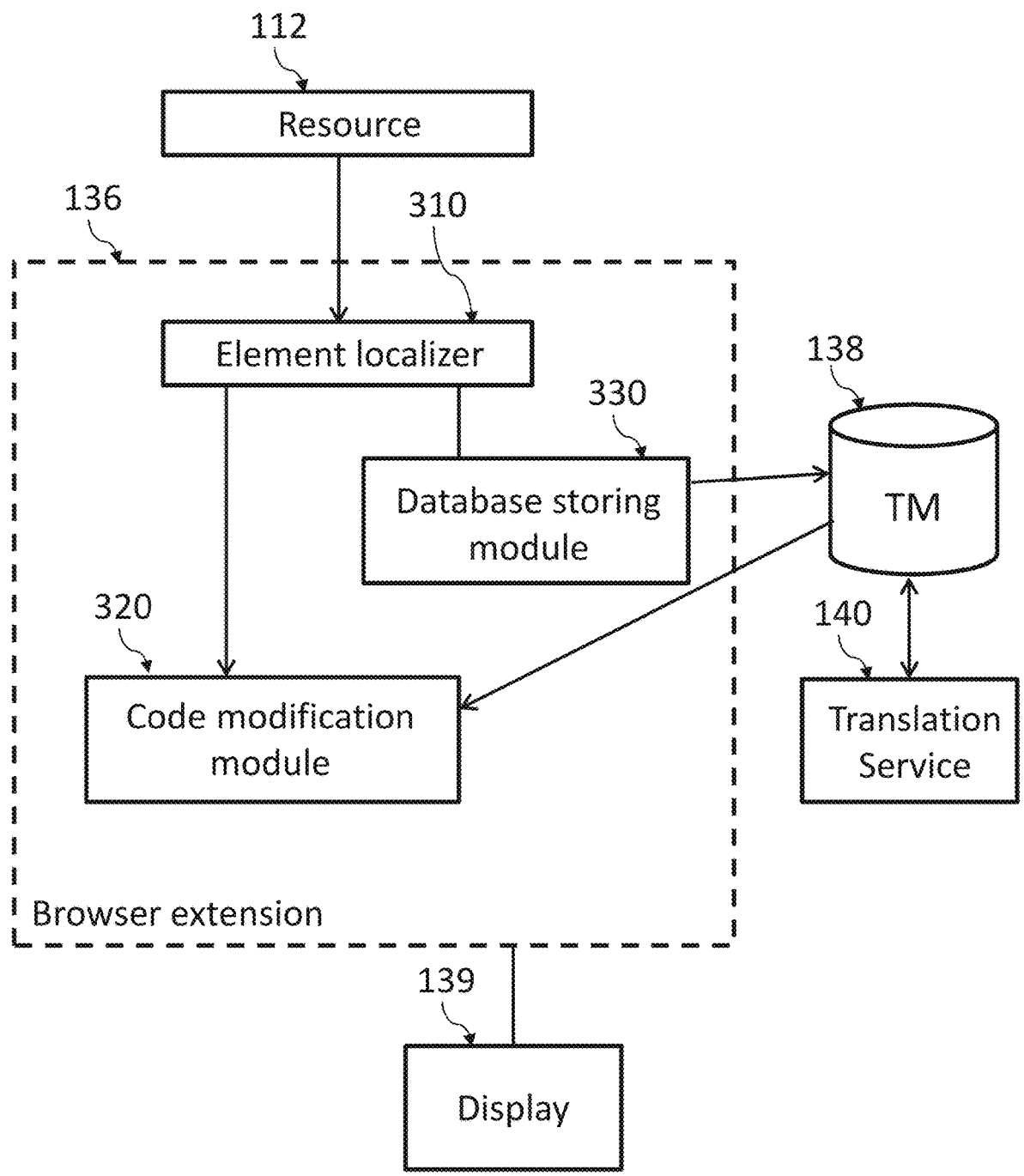
FIG. 3 is a diagram of modules of a browser extension in accordance with one embodiment of the present technology.

Turning now to FIG. 3, a diagram of a composition of a browser extension is illustrated in accordance with one embodiment of the present technology. Upon request of a user, a resource 112 is transmitted to the browser extension 136. The resource 112 comprises a corresponding user-interface source code to be rendered by the display device 139 to display elements of the resource 112. Elements of the resource 112 may be text elements, images, hyperlinks, etc. An element localizer module 310 is configured to browse the user-interface source code and detect text elements of the user-interface source code. A browsing of the user-interface source code by the element localizer 310 is described hereinafter. Upon detection of a text element, a database storing module 330 is configured to populate the first list of the correspondence table with the text element, a text element being generally a word, a sentence and/or a group of sentences that is comprised in a source code and displayed to the user in the rendering of the source code on the display device 139. Therefore, the first list comprising at least a portion of the text elements comprised in the user-interface source code is populated in the TM 138.

The TM 138 is communicably connected to the translation service 140. The connection between the TM 138 and the translation service may be, but is not limited to, an internet connection over the network 120 or a different network. Upon completion of the browsing of the source code of the resource 112 by the element localizer module and the population of the first list of the TM, the TM is configured to request and receive a translation of the text elements of the first list in a target language from the translation service 140 and populate a second list. Therefore, each text element in the source language of the first list detected in the user-interface source code is associated with a text element in the target language in the second list of TM 138, the text elements in the second language being translations, provided by the translation service 140, of their corresponding text elements in the source language. The two lists of the TM 138 may form the correspondence table.

The TM is further configured to populate the second list of the correspondence table with a source text element itself if no translation is provided by the translation service 140 for this source text element. In other words, the source text element will be displayed in the rendering of the translated user-interface source code on the display device 139.

In one embodiment, the first list of the correspondence table is populated in the TM 138 with all the text elements comprised in the user-interface source code of resource 112 before establishing a communication between the TM 138 and the translation service 140. In the same or another embodiment, the browser extension 136 is configured to browse a complete set of resources relating to a resource 112, and populate the first list of the correspondence table with text elements of the complete set of files before establishing a communication between the TM 138 and the translation service 140. As an example, the resource 112 may be a web-based software application comprising a plurality of user-interfaces. The browser extension 136 is configured to process the plurality of user-interface source code corresponding to the plurality of user-interface of the web-based software application. The correspondence table may be locally stored in the web browser 134 of the user device 130. In the same or another embodiment, the user may access the TM 138 and edit the target text elements of the second list to correct them if needed once the translation service provided target text element to the correspondence table. In the same or another embodiment, the user may select the translation service to be communicably connected to the TM 138 among different translation services. The translation service 140 may be a web-based translation provider, such as Google Translate API from Google™.

Enterprise software applications (ESA) and web-based software applications in general may be usually updated on a regular basis depending on the needs of the enterprise and/or the owner of the software application. A user may access a resource 112 that may be an ESA or a web-based software application prior to an update of resource 112. The user may access the same resource 112, corresponding to the same resource address in the web server 110, later in time, subsequent to the update of resource 112. In the event of an update of the web-based software application between the two accesses, the system is configured to store the correspondence table corresponding to the non-updated version of the web-based software application in a memory of the user device 130 and append the correspondence table with new source text element that are comprised only in the updated version of the web-based software application. In other words, in some embodiments, the correspondence table is not generated all over again when an updated version of the web-based software application is released.

A comparison of the time of the last access of a user to the web-based software application with the time corresponding to the update of the web-based software application may be performed by adding a time-tag to new source text elements in the user-interface source code of the updated web-based software application. As an example, a read-only property "timeStamp" may be linked with new source text elements in the user-interface source code of the updated web-based software application. The "timeStamp" property returns the difference in time (in milliseconds) between the time of event corresponding to the addition of a new element to resource 112 and Jan. 1, 1970. The time-tag may be further compared to the time of the last access of a user to the web-based software application, so the browser extension 136 may detect new elements of the web-based software application. An update of the web-based software application may be determined when the time corresponding to a time-tag of an element of the web-based software application is found prior to the time of the access of the user to the web-based software application.

The database storing module 330 may be configured to append the first list of the correspondence table with new source text elements. The TM 138 may be then configured to transmit only new source text element to the translation service 140 and append the second list of the correspondence table with new target text elements corresponding to new source text elements.

A code modification module 320, communicably connected with the TM 138 and the text element localizer 310, is configured to generate the translated user-interface source code of the resource 112 based on the user-interface source code of the resource 112, an edition of the user-interface source code including replacing source text element in the source language by their corresponding target text elements in the target language and editing layout tags to adapt a layout of the translated user-interface source code of the resource 112 to the target language, notably for LTR-to-RTL or RTL-to-LTR translation. Once the user-interface source code of the resource 112 is processed by the code modification module, the browser extension 136 transmits the translated user-interface source code of the resource 112 to the display 139 of the user for rendering.

In the illustrative embodiment, the browser extension 136 comprises three distinct modules: the element localizer 310, the database storing module 330 and the code modification module 320. The three modules described hereinbefore may be merged into one or two modules, or divided into a higher number of modules with the same or equivalent features. This is done merely as an aid to understanding, and not to define the scope or set forth the bounds of the present technology. This aspect is not limitative.

FIG. 4 is an interface of a correspondence table 400 of a Translation Memory in accordance with one embodiment of the present technology. A first list 410 of the dictionary 400, populated by the database storing module 330, comprises the source text elements of the resource 112. Column 420 indicates the target language selected by a user. A second list 430 comprises translated text elements in the second language, or "target text elements", the target text elements being translations of the corresponding source text element on the same line of the correspondence table. Column 440 indicates the percentage of the source text element that has been translated in the second list 430. Column 450 allows a user to indicate another user that the corresponding translation has been reviewed or not. Buttons 460 allow a user to manually edit the corresponding target text elements in the second list 430. Buttons 470 allow a user to select a translation service for the corresponding line of the correspondence table 400. Button 480 allow a user to delete a line of the correspondence table 400.

In one embodiment, the browser is configured to generate a Document Object Model (DOM) tree object of the resource 112. The DOM tree object is constructed as a tree structure in accordance with one embodiment of the present technology illustrated on FIG. 5. Each branch of the tree ends in a node, and each node contains objects. The resource node is considered the root node of the DOM tree object. The Element nodes are considered the branch nodes of the DOM tree object. The Text nodes are considered the leaf nodes of the DOM tree object as they have no children element. The Element nodes may also contain attributes that have values, such as font size, font color, etc. As an example, a node 510 on FIG. 5 has two child element nodes 512 and 514, nodes 514 and 512 being considered as "sibling" nodes, a node 513 is a leaf node of a branch 511 and a parent node of node 513 is node 512. Each node of a DOM tree object typically contains information about the component being represented, such as an XML element tag name and/or content value, as well as index or pointer values that bind the DOM node into the tree structure, including an indicator of a parent node, preceding sibling and next sibling, a child list, and possibly a separate attribute list.

Figure 5:
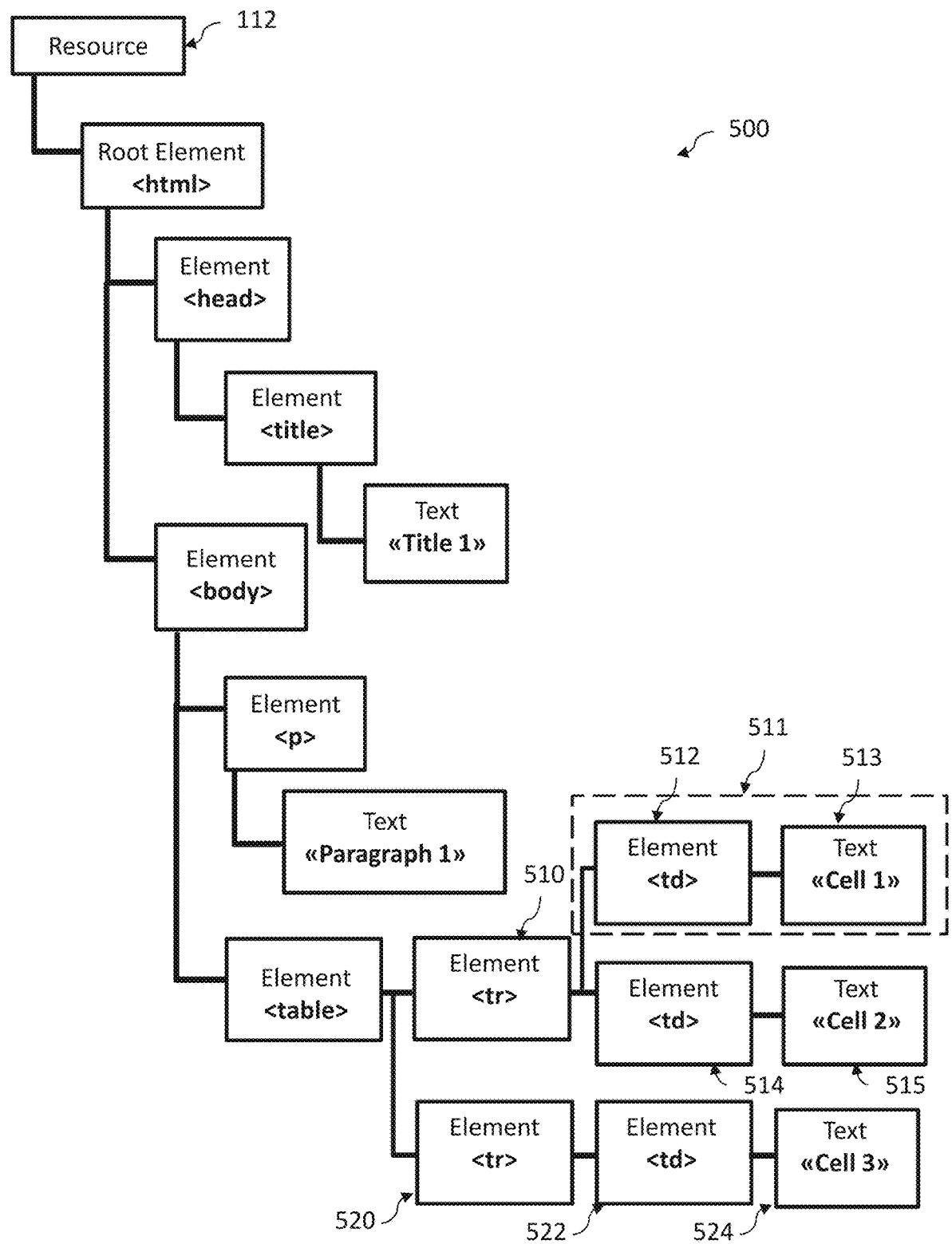
FIG. 5 is a representation of a Document Object Model in accordance with one embodiment of the present technology.

The DOM tree object illustrated on FIG. 5 is only set forth as an example of a resource 112. FIG. 5 is merely an aid to understanding and does not define the scope or set forth the bounds of the present technology.

Figure 6:
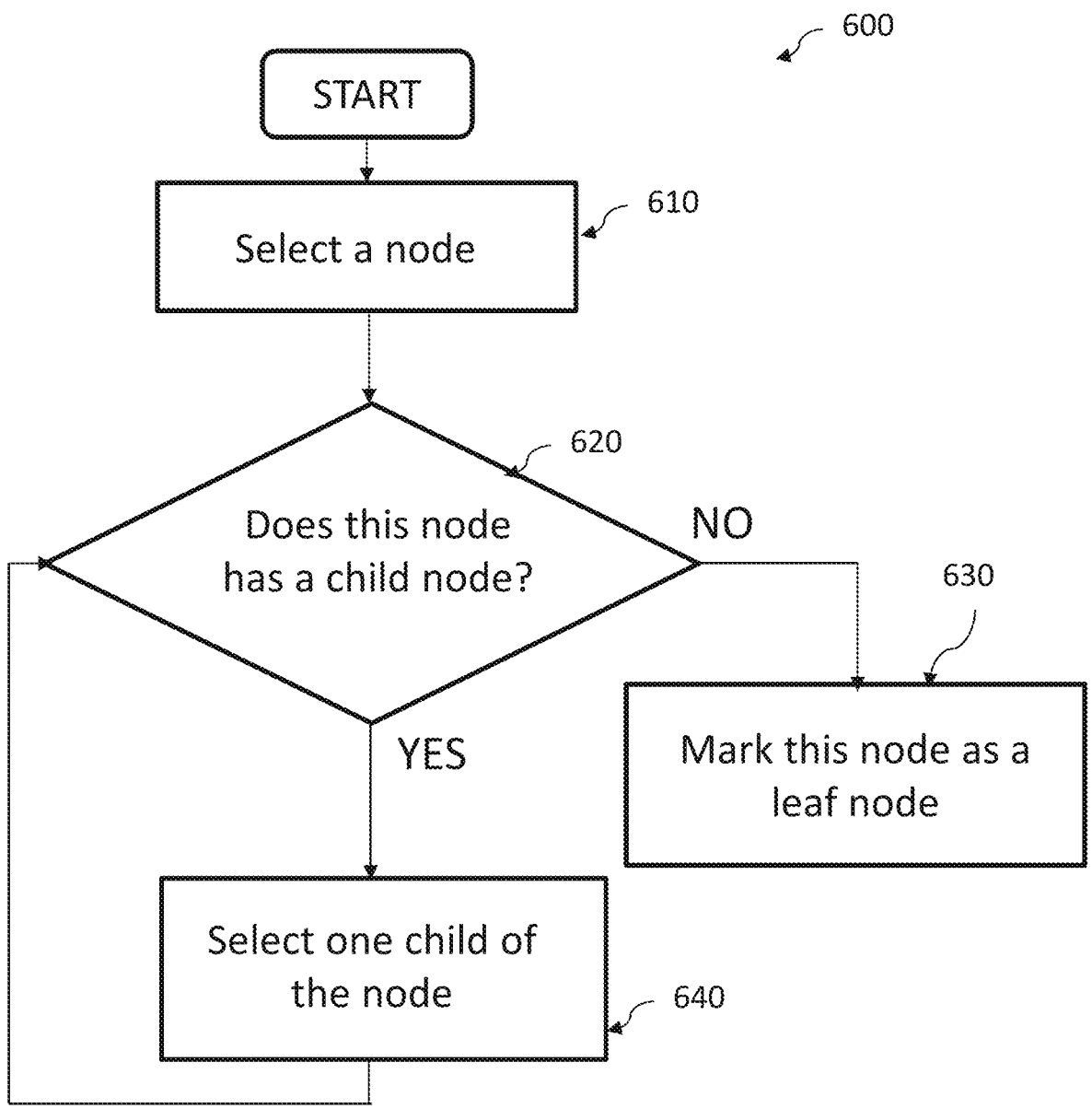
FIG. 6 is a flowchart of a process to find leaf nodes in accordance with one embodiment of the present technology.

FIG. 6 is a diagram of a flowchart of a process to find leaf nodes in accordance with one embodiment of the present technology. In one embodiment, the browser extension is configured to select 610 a node of the DOM tree object generated by the browser from the resource 112 and use information relating to the children nodes of the selected node. Determination 620 is made whether the selected node has a child node. If the selected node has one or more child nodes, the browser extension 136 is configured to select one of the one or more children node and repeat the process 640. If the selected node has no children node, the selected node is marked as a leaf node 630. Marking a node as a leaf node may be made in different ways, such as a specific Boolean set to "True" when the node is a leaf node.

In another embodiment, a Javascript variable "Node-.childNodes" is used to return a list of children nodes of a node element. If the list is found empty, the current node is marked as a leaf node.

In the same or another embodiment, the process illustrated by the flowchart on FIG. 6 may enable processes described hereinbelow to process with leaf nodes first. This is done to ensure that every branch of the DOM tree object is processed, starting with smallest complete pieces of text corresponding to a text element of a leaf node such as a sentence in a paragraph, a cell of a chart comprising text or the like, and provide a more robust and precise procedure.

The process or a portion of the process illustrated by the flowchart of FIG. 6 may be implemented as code of the browser extension 136 (e.g., executable instructions of one or more computer programs, or one or more applications executing collectively on one or more processors, by hardware, or combinations thereof). The code may be stored on a computer-readable storage medium; for example, in the form of a computer program comprising a plurality of instructions executable by one or more processors on the user device 130.

Figure 7:
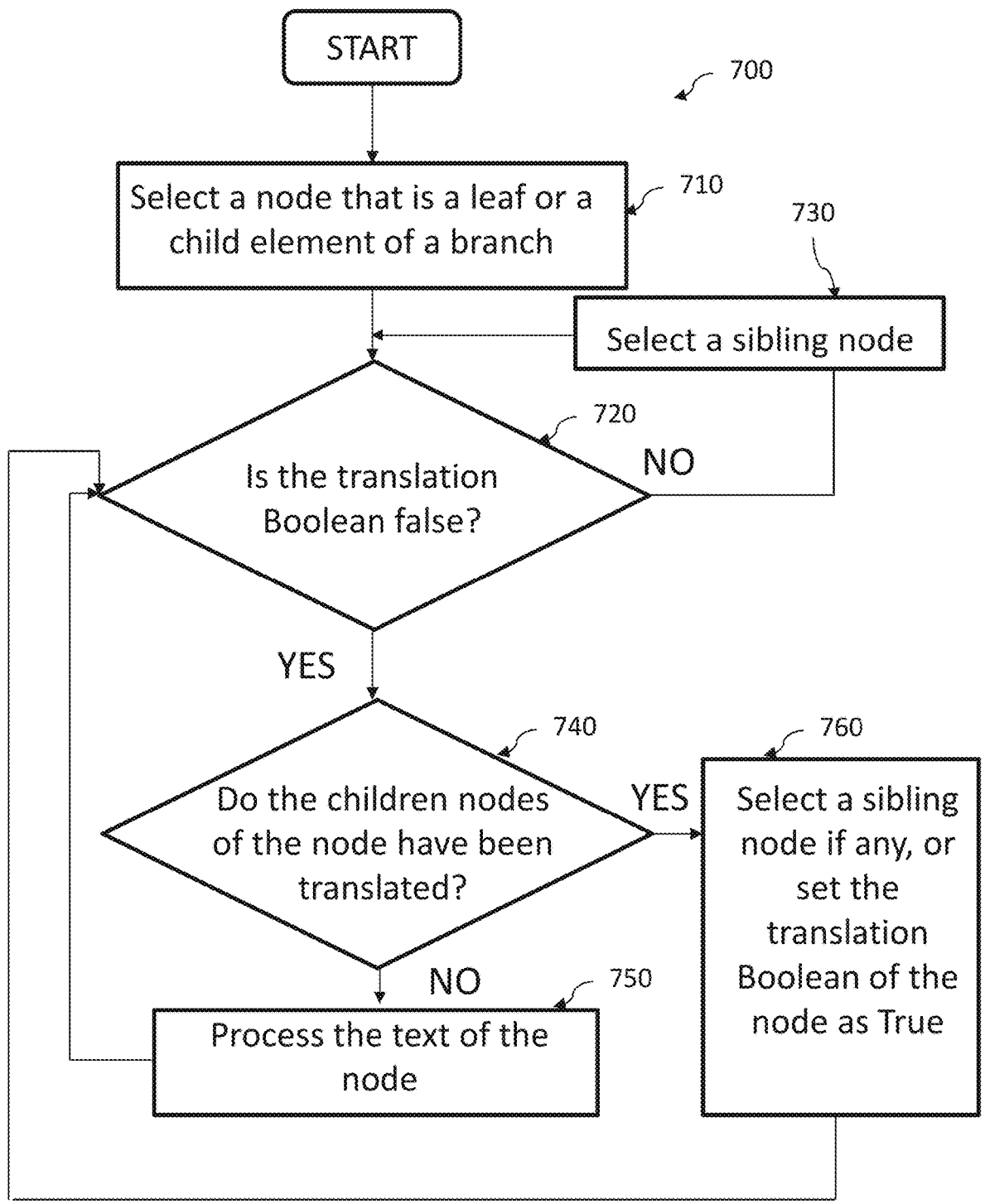
FIG. 7 is a flowchart of a process to optimize a browsing of a resource in accordance with one embodiment of the present technology.

FIG. 7 is a flowchart of a process 700 to optimize a browsing of a resource in accordance with one embodiment of the present technology. The process 700 is executed by the browser extension 136, the resource 112 being previously received by the browser 134 and a DOM tree object being previously generated by the browser 134 from the resource 112. The process 700 may be used subsequently to the process 600. A non-translated leaf node of the DOM tree object is selected 710. A determination 720 is made whether the selected leaf node has already been translated. The determination whether the selected leaf node has already been translated may be performed in any suitable manner. For instance, a translation Boolean may be associated with the node indicating if the node has been translated.

In an embodiment, if the selected node has been translated, a sibling node is selected 730 and the process 700 is applied to the sibling node starting at determination 720. As an example, if the leaf node 513 of FIG. 5 is being processed and determination is made that the translation Boolean of leaf node 513 is "True", leaf node 515 is selected. Information comprised in one node relating to a number of sibling nodes of the one node may allow the process not to perform an infinite loop and process the parent nodes when the translation Booleans of all the siblings of one branch are "True". As an example, the nodes 512 is selected when determination is made that translation Booleans of node 513 and 515 are "True".

If determination is made that the translation Boolean of the selected node is "False", determination 740 is made whether the children nodes of the node have been translated using their respective translation Boolean. If determination 740 is made that a children node is not translated (i.e. its translation Boolean is "False"), the children node is selected to process a translation of its text element 750. As an example, once the node 510 has been processed, a sibling node 520 is selected. Determination is made that its translation Boolean is "False". Therefore, leaf node 524 is selected to be translated. A translation process is further detailed in a later figure. If determination 740 is made that a children node is translated (i.e. its translation Boolean is "True"), a sibling node is selected and the process 700 is applied to the sibling node starting at determination 720 until all the sibling node are processed and the parent node may be selected.

In the same or another embodiment, if the selected node is an input field, a text area or the like, the translation process is not applied to the node and the translation Boolean of the node is set as "True".

It is noted that the process 700, or variations thereof, may be used to, in appropriate situations, browse a DOM of resource 112 to optimize a translation of the text elements of the resource 112. The process or a portion of the process 700 illustrated by the flowchart of FIG. 7 may be implemented as code of the browser extension 136 in the code modification module (e.g., executable instructions of one or more computer programs, or one or more applications executing collectively on one or more processors, by hardware, or combinations thereof). The code may be stored on a computer-readable storage medium; for example, in the form of a computer program comprising a plurality of instructions executable by one or more processors on the user device 130.

Figure 8:
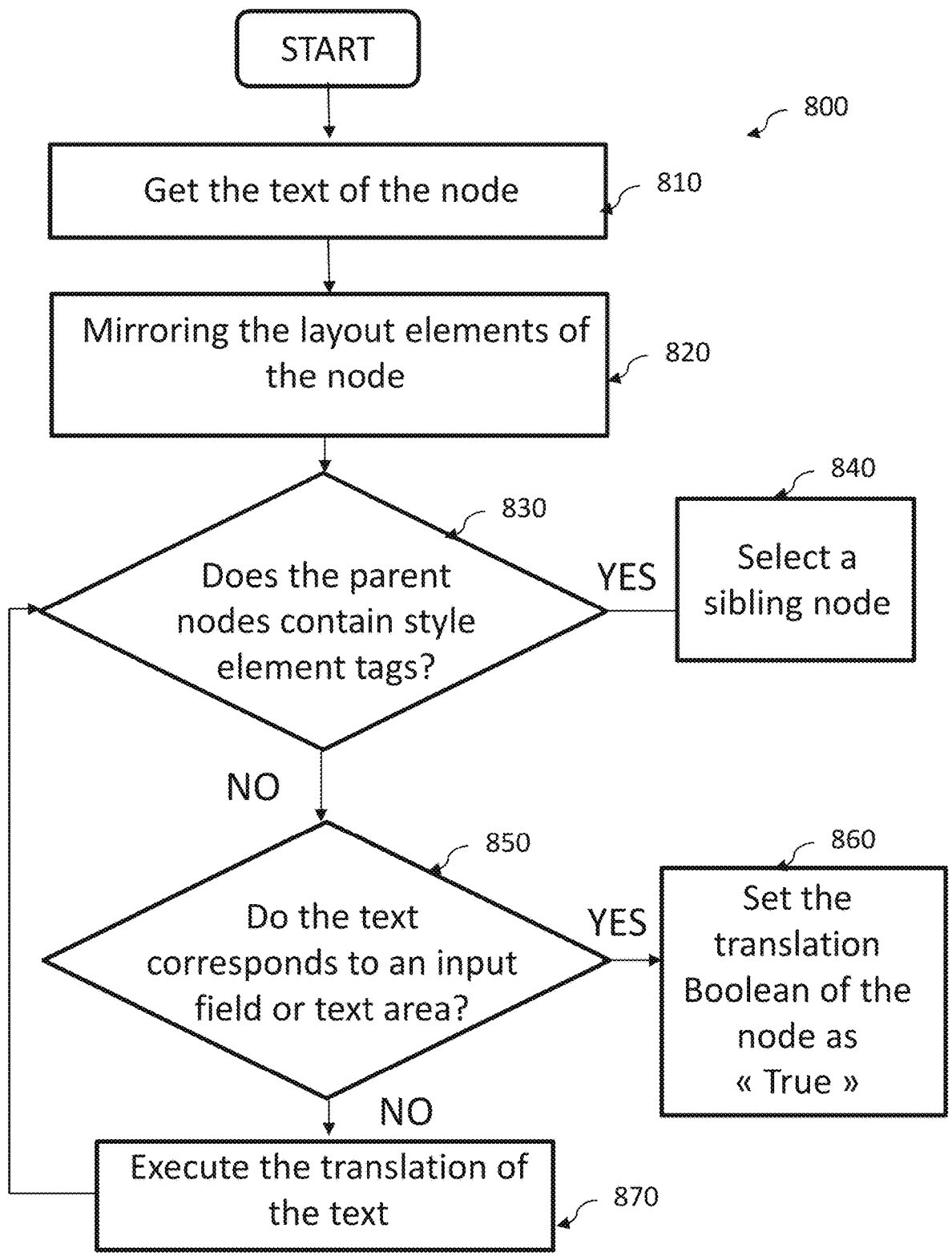
FIG. 8 is a flowchart of a process to translate an element of a resource in accordance with one embodiment of the present technology.

FIG. 8 is a flowchart of a process 800 to translate an element of a resource in accordance with one embodiment of the present technology. The process 800 may be implemented to process the node in FIG. 7 at step 750. The process 800 starts with a selected node whose translation Boolean is "False". A text element of the node is selected 810. Layout tags relating to the node are edited to mirror a layout of the node 820 if the second language requires mirroring the text elements of the resource 112. Step 820 may or may not be included in process 800 depending if the second language requires a RTL or a Left-to-Right (LTR) translation or not. A mirroring process is further detailed in a later figure.

Determination 830 is made whether parent nodes contain style element tags such as italic, bold tags or the like, using the DOM tree structure. If determination is made that a parent node contains style element tags, the node will be processed when its parent node is processed. In this case, a sibling node is selected 840. If determination is made that the parent nodes do not comprise style element tags, determination 850 is made whether the text element of the node corresponds to an input field, a text area or the like. If determination is made that the text element of the node corresponds to an input field, a text area or the like, the translation Boolean of the node is set as "True" 860. If determination is made that the text element of the node does not correspond to an input field, a text area or the like, a translation of the text element is executed 870.

The translation of a source text element of a node in the source language comprises browsing the dictionary of the TM 138 to locate a text element in the source language in the correspondence table that corresponds, or at least partially corresponds, to the source text element of the node. Once the text element in the correspondence table is located, the source text element of the node is replaced by a target text element in the source code of the resource 112, the target text element being a translation of the text element located in the correspondence table of the TM.

In the event of a missing translation for a source text element, the process 800 is further configured to mark the corresponding node as translated and populate the second list of the correspondence table with the source text elements itself. Therefore, the source text element will be displayed on the translated user-interface source code. In the same or another embodiment, a layout of the source text element in the translated user-interface source code may be edited to indicate the user that it has not been translated, by underlining it for example.

In the event of a detection of a dynamic value comprised in the node, a placeholder is set to indicate a location of the dynamic value in the node. The rest of node is translated according to the process described hereinabove and the dynamic value is eventually set in the corresponding placeholder in the translated node.

The process 800 or a portion of the process illustrated by the flowchart of FIG. 8 may be implemented as code of the browser extension 136 (e.g., executable instructions of one or more computer programs, or one or more applications executing collectively on one or more processors, by hardware, or combinations thereof). The code may be stored on a computer-readable storage medium; for example, in the form of a computer program comprising a plurality of instructions executable by one or more processors on the user device 130.

The resource 112 is considered as translated once every nodes of the DOM generated from the resource 112 have their translation Boolean set as "True". However, the layout of the translated representation of the resource 112 must be adapted to the second language, notably when the translation is a RTL-to-LTR or a LTR-to-RTL translation.

One aspect of the present technology is to provide a translation solution for Right-to-Left (RTL) scripted language such as Arabic or Hebrew. Such solution covers translation from a RTL language to a LTR language (RTL-to-LTR translation) and from a LTR language to a RTL language (LTR-to-RTL translation). Therefore, the translation process may include a layout mirroring step to adapt a layout of the translated representation of the resource 112 in the event of a RTL-to-LTR or a LTR-to-LTR translation.

Figure 9:
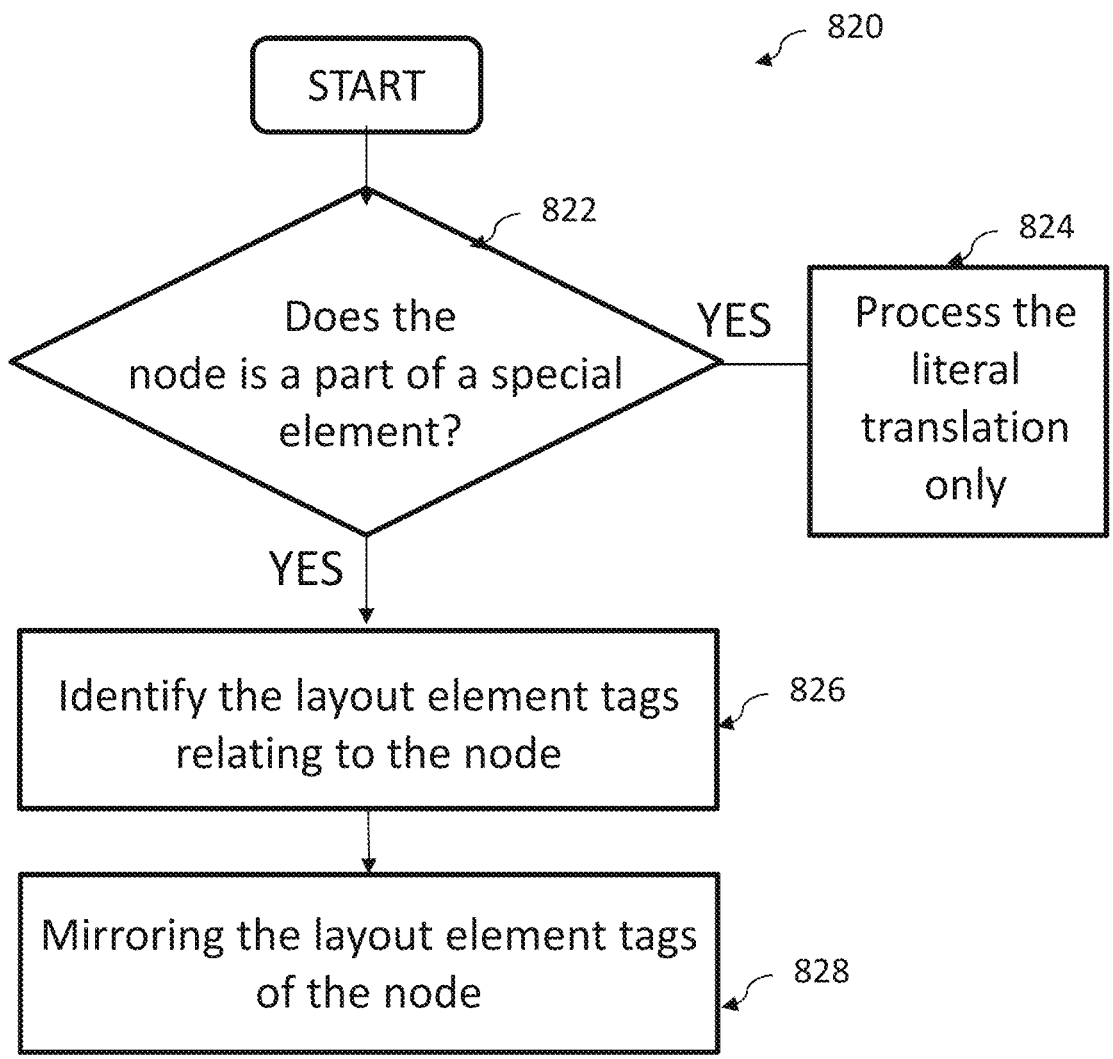
FIG. 9 is a flowchart of a process to mirror an element of a resource in accordance with one embodiment of the present technology.

FIG. 9 is a flowchart of a process 820 to mirror an element of a resource in accordance with one embodiment of the present technology. The process 820 may be implement in the process 800 to perform a literal translation and a mirroring 820 of the layout elements of a node simultaneously.

Determination 822 is made whether the node is a part of a special element. Special elements are selected from a group of special elements, the group of special elements comprising calendar, arrows of carousels, arrows of calendar. The group of special elements may be editable and may depend on an application of the process 820 and/or a type of the resource to be translated. Determination 822 may be made in different manners, for example by identifying specific style element tags and/or specific layout element tags. If determination is made that the node is a part of a special element, the node is not mirrored, and only literal translation of its text element is performed 824. If determination is made that the node is not a part of a special element, the layout element tags relating to the current node are identified 826. Upon identification, layout element tags are replaced by horizontally mirrored layout element tags 828. As an example, identification of a padding on the left of a text element in a LTR scripted language leads to a padding on the right of a text element in a RTL scripted language.

Replacement of layout element tags may be made by generating new styles based on styles of a class of the node and applying new generated styles to the node. In the same or another embodiment, the HTML hyperlinks are preserved by saving a destination of the HTML hyperlink in a temporary memory and associating the hyperlink to a translation of a hypertext corresponding to the HTML hyperlink.

The process 820 or a portion of the process illustrated by the flowchart of FIG. 9 may be implemented as code of the browser extension 136 (e.g., executable instructions of one or more computer programs, or one or more applications executing collectively on one or more processors, by hardware, or combinations thereof). The code may be stored on a computer-readable storage medium; for example, in the form of a computer program comprising a plurality of instructions executable by one or more processors on the user device 130.

Once a node is mirrored, a mirroring Boolean of the node may be set to indicate that the node has been mirrored. Hereinbelow is an example of a source code of a resource 112 in HTML5 with text element in a source language:

```
<div class="w-hint w-hint-box-noexpand">
<a class ="w-hint-trigger" bref="javascript:void(0);">
<var bh="HME" class="w-hint-expand w-hint-togl">More</var>
<var bh="HMC" class="w-hint-collapse w-hint-togl">Less</var>
</a>
<div id="_oo3iid" class="w-hint-box" style="">To create a Procurement
Contract Request, specify the fields below. Templates used for constructing
your Procurement Contract Request appear in the section at the bottom
of the page, and available Templates may change depending on
the project attributes you enter. </div>
</div>
```

Upon activation by a user of the web browser extension 136 to translate the resource 112 in Arabic, the web browser extension generates the following HTML5 code to be displayed, the target language being Arabic:

```
<div class="w-hint w-hint-box-noexpand dasrtlapplied"
style="direction: rtl; text-anchor: end !important;">
<a  class=w-hint-trigger  dasrtlapplied"  bref="javascript:void(0);"
style="direction: rtl; text-anchor: end !important;">
<var bh="HME" class="w-hint-expand w-hint-togl dastrlapplied"
style="direction: rtl; float: left !important; text-anchor: end !important;
padding-right: 15px !important; padding-left: inherit
!important; ">المزيد</var>
<var bh="HMC" class="w-hint-collapse w-hint-togl dastrlapplied"
style="direction: rtl; float: left !important; text-anchor: end !important;
padding-right: 9.75px !important; padding-left: inherit
!important; ">أقل</var>
</a>
<div id="_oo3iid" class="w-hint-box dasrtlapplied" style="direction: rtl;
text-anchor: end !important;">حدد الحقول أدناه لإنشاء طلب تعاقد الإعداد راءلشلل،
طلب لإنشاء المستخدمة القوالب تظهر أدناه الحقول
وقد ،الصفحة أسفل في القسم في للشراء للإعداد تعاقد
تدخلها مع سمات على بناءالمنوفرة النماذج تتغير
المشرو التي</div>
</div>
```

The text elements of the sections of the code have been translated and marked as mirrored by the mirrored Boolean "dasrtlapplied" in a class definition of the elements. In one embodiment, the definitions of classes of the translated representation of the resource are generated based on a CSS style sheet of the original source code of the resource 112. As an example, the browser extension is configured to detect layout tags in the class "w-hint-expand w-hint-togl" of the original source code and generate a new class "w-hint-expand w-hint-togl dasrtlapplied" whose layout elements are mirrored representation of the layout elements of the original source code. In this example, text elements of the "w-hint-expand w-hint-togl" class have a left-padding of 15 px. Therefore, text element of the "w-hint-expand w-hint-togl dasrtlapplied" class have a right-padding of 15 px.

Once the translated user-interface source code of the resource 112 is rendered on the display 139, the user may be asked to interact with the resource 112, for instance by pressing a button, selecting an item in a drop-down menu, filling and sending a form, etc. The browser extension may be configured to associate each node of the DOM of the resource 112 in the target language to its corresponding node in the source language and further transmit request to the web server with elements in the source language. As an example, a drop-down menu of the resource 112 may originally allow a user to select either "YES" or "NO" as an answer in a first language, the source language being English in this example, and the user may be displayed a translated user-interface of the resource 112 in the target language. If the user selects the answer in the target language corresponding to "YES", the web browser extension 136 will transmit information that the user selected "YES".

Figure 10A:
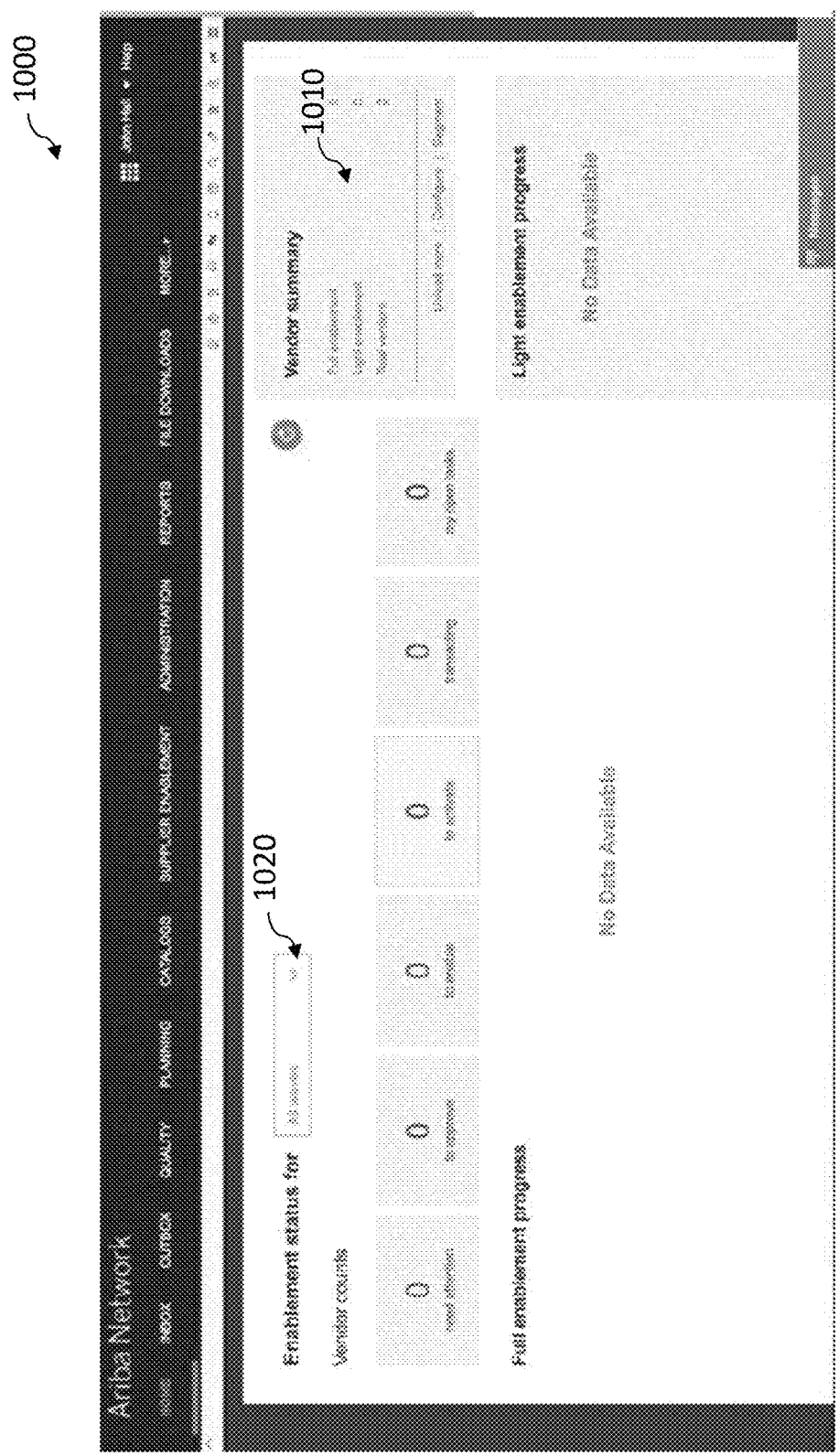
FIG. 10A is an exemplary web page of a web-based enterprise software application in accordance with one embodiment of the present technology.
Figure 10B:
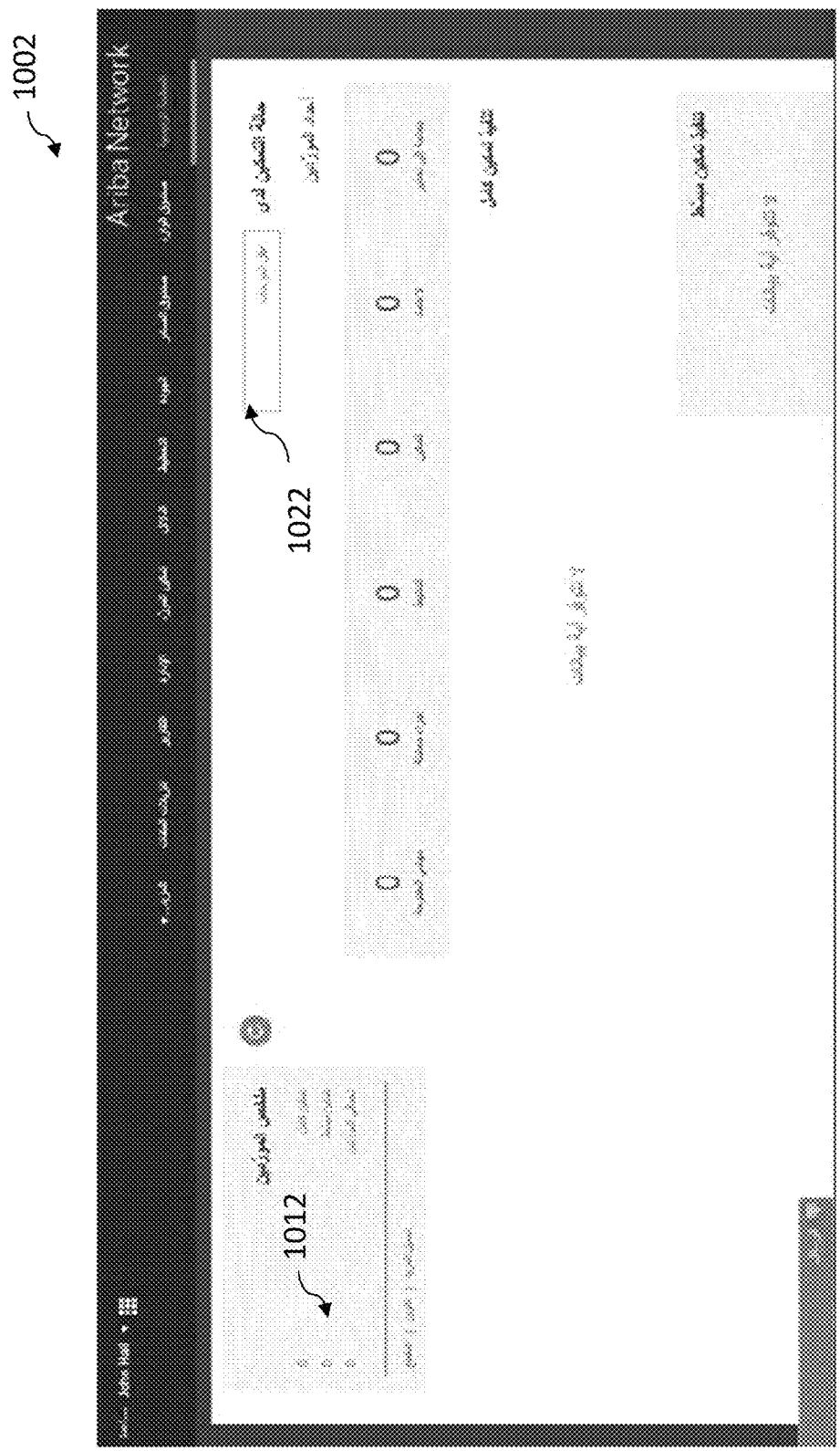
FIG. 10B is a translated representation of the exemplary web page illustrated on FIG. 10A in accordance with one embodiment of the present technology.

FIG. 10A is an exemplary user-interface 1000 from a web-based enterprise software. The user-interface 1000 comprises a menu 1010 on the right side and a drop-down menu 1020. The source language is English. FIG. 10B is a rendering 1002 of the translated user-interface source code of the user-interface 1000 generated by the web-browser extension 136. The target language selected by a user to obtain the rendering 1002 is Arabic. The text elements are translated, and the layout is adapted to Arabic. The representation of the menu 1010 is the translated menu 1012 on the left side of the web page 1002 and the representation of the drop-down menu is the drop-down menu 1022.

Figure 11:
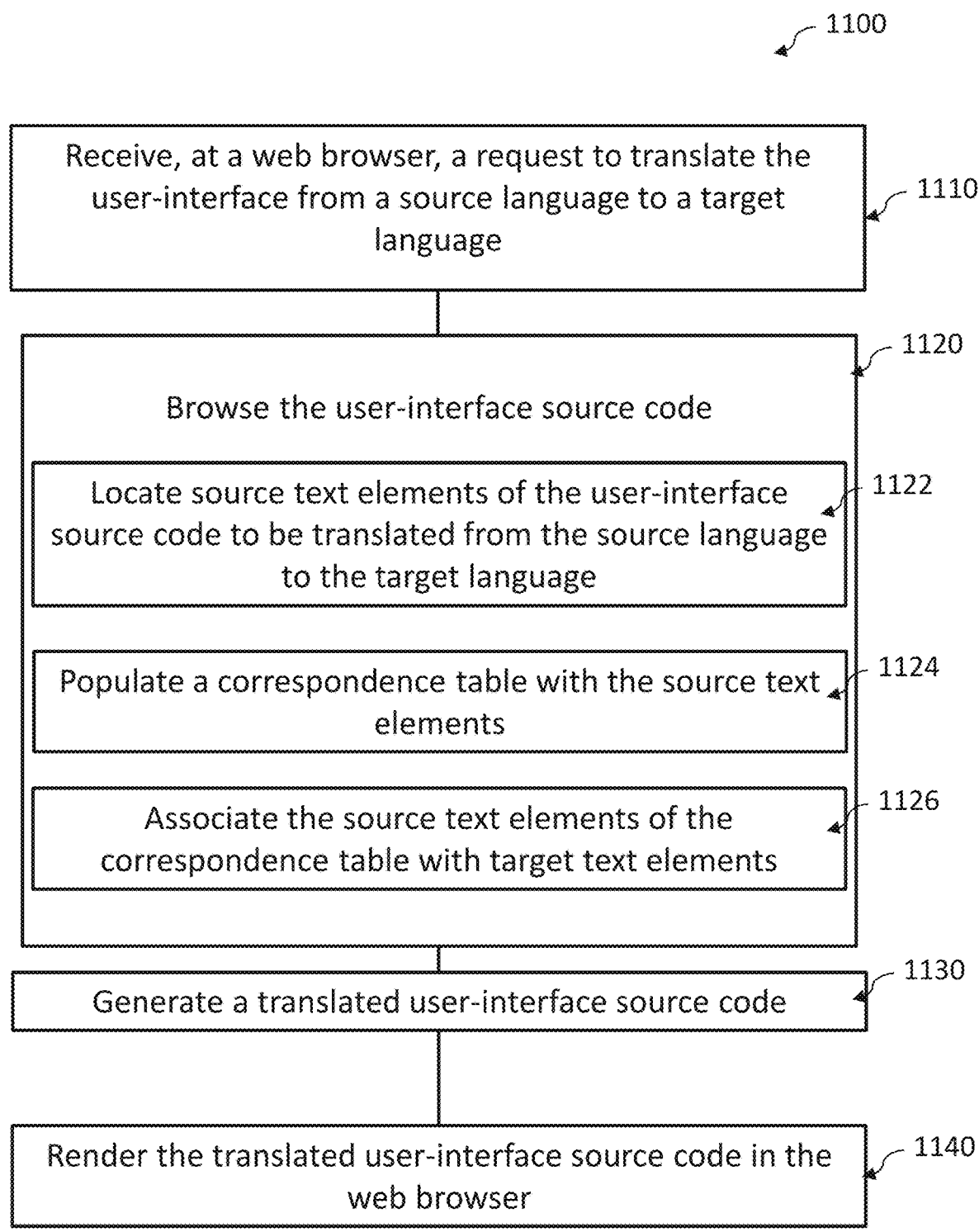
FIG. 11 is a sequence diagram showing operations of a method for translating a user-interface of a web-based software application in a web browser environment in accordance with one embodiment of the present technology.

FIG. 11 is a sequence diagram showing operation of a method of translating a user-interface of a web-based software application in the web-browser environment 100 in accordance with one embodiment of the present technology. On FIG. 11, a sequence 1100 comprises a plurality of operations that may be executed in variable order, some of the operations possibly being concurrently, some of the operations being optional.

The user-interface may be displayed on the display device 139 by a rendering of the corresponding user-interface source code received by the user device 130 from the web server 110. A request from the user to translate the user-interface is emitted at operations 1110, the user-interface source code being coded, and therefore rendered, in a source language. The request may be by clicking a button on the user-interface and/or enabling the browser extension 136 to operate, the request may comprise a selection of a target language. Upon receipt of the request, the user-interface source code is browsed at operation 1120. This operation 1120 may comprise a sub-operation 1122 where, the source text elements of the user-interface are located. A location of the source text elements may be determined by generating a Document Object Model (DOM) tree from the user-interface source code and locating node of the DOM tree that contains text elements. A first list of a correspondence table is populated with source text elements at sub-operation 1124. The correspondence table may be stored in a database corresponding to the web browser, in a memory of the user device and/or in an external server communicably connected to the user device via a network. The source text elements are associated with target text elements at sub-operation 1126, the target text elements being translations of corresponding source text element in the target language. The first list comprising source text elements may be transmitted to a translation service. In this case, a second list of the correspondence table is generated and populated with corresponding target text elements provided by the translation service.

A translated user-interface source code is generated at operation 1130. The translated user-interface source code may be generated by replacing the source text elements with the corresponding target text elements in the user-interface code. In the same or another embodiment, generating a translated user-interface source code comprises modifying a layout of the user-interface by editing source layout tags comprised in the user-interface source code. As an example, if the source language is a RTL language script and the target language is a LTR language script, or if the source language is a LTR language script and the target language is a RTL language script, the layout of the user interface is horizontally mirrored by locating and determining the source layout tags of the user-interface source code. The source layout tags are replaced by target layout tags, the target layout tags being horizontally mirrored version of the source layout tags. As an example, if determination is made that a source layout tag renders a padding of 9.5 pixels on the left of a source text element on the display device 139, the source layout tag is replaced by a target layout tag that renders a padding of 9.5 pixels on the left of the corresponding target text element on the display device 139. The translated user-interface source code is eventually rendered on the display device 139 at operation 1140.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method for translating a user-interface of a web-based software application in a web browser environment, the method comprising:
    receiving, at a web browser, a request to translate the user-interface from a source language to a target language;
    browsing a user-interface source code, the browsing comprising:
    locating source text elements of the user-interface source code to be translated from the source language to the target language;
    populating a first listing of a correspondence table stored in a memory of the web browser with the located source text elements;
    associating the source text elements of the first listing of the correspondence table with target text elements corresponding to the source text elements translated in the target language;
    populating a second listing of the correspondence table with the associated target text elements;
    generating a translated user-interface source code based on the user-interface source code and the first and second listings of the correspondence table; and
    rendering the translated user-interface source code in the web browser,
    wherein the generating of the translated user-interface source code comprises selecting a first element of the user-interface source code and applying a replacement process to the first element, and
    wherein the replacement process comprises:
        when determination is made that child elements of the first element are marked as replaced, replacing a source text element of the first element by a corresponding target text element and marking the first element as replaced;
        when determination is made that one or more child elements of the first element are not marked as replaced then:
            selecting one of the one or more child elements of the first element;
            applying the replacement process to the one of the one or more child elements of the first element; and
        when determination is made that the first element is marked as replaced, applying the replacement process to a parent element of the first element.

2. The method of claim 1, wherein associating the source text elements of the correspondence table with the target text elements comprises:
    transmitting the source text elements to a translation service; and
    receiving the target text elements translated in the target language.

3. The method of claim 1, wherein prior to generating the translated user-interface source code, the target text elements are presented to a user for review and editing.

4. The method of claim 1, wherein the user-interface is a part of a set of user-interfaces comprising a plurality of user interfaces and browsing the user-interface source code comprises browsing a plurality of user-interface source codes, the plurality of user-interface source codes corresponding to the plurality of user interfaces comprised in the set of user-interfaces.

5. The method of claim 1, wherein one of the source language or the target language is a dextrosinistral (Right-To-Left) language script and another one of the source language or the target language is a sinistrodextral (Left-To-Right) language script.

6. The method of claim 5, wherein generating the translated user-interface source code further comprises:
    selecting a second element in the user-interface source code;
    applying a layout mirroring process to the second element, the layout mirroring process comprising:
        when determination is made that child elements of the second element are marked as mirrored, editing layout elements corresponding to the second element to horizontally mirror the layout of the second element and marking the second element as mirrored;
        when determination is made that one or more child elements of the second element are not marked as mirrored:
            selecting one of the one or more child elements of the second element;
            applying the layout mirroring process to the one of the one or more child elements of the second element; and
        when determination is made that the second element is marked as mirrored, applying the layout mirroring process to a parent element of the second element.

7. The method of claim 6, wherein applying the replacement process to the first element and applying the layout mirroring process to the second element are executed simultaneously.

8. The method of claim 6, further comprising, prior to applying the layout mirroring process:
- determining whether the second element is a special element, the special elements being selected from a group consisting of: calendars, carousels, graphs and charts; and
- when the second element is a special element, marking the second element as mirrored.

9. A system for translating a user-interface of a web-based software application in a web browser environment, the system comprising:
- a user device communicably connected to a web server via a network, the user device comprising:
  - a display device configured to render the user-interface;
  - a memory configured to store a plurality of text elements and instructions; and
  - a processor operably coupled to the memory and configured to execute the instructions that, when executed, results in operations comprising:
    - receiving, at a web browser, a request to translate the user-interface from a source language to a target language;
    - browsing a user-interface source code, the browsing comprising:
      - locating source text elements of the user-interface source code to be translated from the source language to the target language;
      - populating a first listing of a correspondence table stored in a memory of the web browser with the located source text elements;
      - associating the source text elements of the first listing of the correspondence table with target text elements corresponding to the source text elements translated in the target language;
      - populating a second listing of the correspondence table with the associated target text elements;
    - generating a translated user-interface source code based on the user-interface source code and the first and second listings of the correspondence table; and
    - rendering the translated user-interface source code in the web browser,
    - wherein the generating of the translated user-interface source code comprises selecting a first element of the user-interface source code and applying a replacement process to the first element, and
    - wherein the replacement process comprises:
      - when determination is made that child elements of the first element are marked as replaced, replacing a source text element of the first element by a corresponding target text element and marking the first element as replaced;
      - when determination is made that one or more child elements of the first element are not marked as replaced:
        - selecting one of the one or more child elements of the first element;
        - applying the replacement process to the one of the one or more child elements of the first element; and
      - when determination is made that the first element is marked as replaced, applying the replacement process to a parent element of the first element.

10. The system of claim 9, wherein associating the source text elements of the correspondence table with the target text elements comprises:
- transmitting the source text elements to a translation service; and
- receiving the target text elements translated in the target language.

11. The system of claim 9, wherein prior to generating the translated user-interface source code, the processor is further configured to present the target text elements to a user for review and editing.

12. The system of claim 9, wherein the user-interface is a part of a set of user-interfaces comprising a plurality of user interfaces and the processor is further configured to browse a plurality of user-interface source codes, the plurality of user-interface source codes corresponding to the plurality of user interfaces comprised in the set of user-interfaces.

13. The system of claim 9, wherein one of the source language or the target language is a dextrosinistral (Right-To-Left) language script and another one of the source language or the target language is a sinistrodextral (Left-To-Right) language script.

14. The system of claim 13, wherein generating the translated user-interface source code further comprises:
- selecting a second element in the user-interface source code;
- applying a layout mirroring process to the second element, the layout mirroring process comprising:
  - when determination is made that child elements of the second element are marked as mirrored, editing layout elements corresponding to the second element to horizontally mirror a layout of the second element and marking the second element as mirrored;
  - when determination is made that one or more child elements of the second element are not marked as mirrored:
    - selecting one of the one or more child elements of the second element;
    - applying the layout mirroring process to the one of the one or more child elements of the second element; and
  - when determination is made that the second element is marked as mirrored, applying the layout mirroring process to a parent element of the second element.

15. The system of claim 14, wherein the processor is further configured to apply the replacement process to the first element and apply the layout mirroring process to the second element simultaneously.

16. The system of claim 14, wherein prior to applying the layout mirroring process, the processor is further configured to:
- determine whether the second element is a special element, the special elements being selected from a group consisting of: calendars, carousels, graphs and charts; and
- when the second element is a special element, mark the second element as mirrored.

* * * * *